(12) United States Patent
He et al.

(10) Patent No.: US 12,019,543 B2
(45) Date of Patent: Jun. 25, 2024

(54) MEMORY SUB-SYSTEM CACHE EXTENSION TO PAGE BUFFERS OF A MEMORY ARRAY

(71) Applicant: Micron Technology, Inc., Boise, ID (US)

(72) Inventors: Deping He, Boise, ID (US); Xing Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/890,511

(22) Filed: Aug. 18, 2022

(65) Prior Publication Data

US 2024/0061778 A1    Feb. 22, 2024

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .................................................. G06F 12/0802
USPC ......................................................... 711/118
See application file for complete search history.

(56) References Cited

U.S. PATENT DOCUMENTS

| 2008/0209108 A1* | 8/2008 | Pyeon | G11C 7/1039 |
| | | | 711/E12.008 |
| 2015/0347314 A1* | 12/2015 | Lee | G06F 12/1009 |
| | | | 711/103 |
| 2023/0176974 A1* | 6/2023 | Shedge | G06F 12/123 |
| | | | 711/154 |

* cited by examiner

*Primary Examiner* — Than Nguyen
(74) *Attorney, Agent, or Firm* — Lowenstein Sandler LLP

(57) ABSTRACT

A system includes a memory device having an array of memory cells coupled with a plurality of page buffers. At least a portion of the array is configured as single-level cell memory. A processing device is coupled to the memory device and includes cache, the processing device to perform operations including: detecting demand for the cache during a memory operation requiring access to the single-level cell memory; and causing metadata associated with the memory operation to be stored in one or more page buffers of the plurality of page buffers, the one or more page buffers operating as an extension of the cache available to the processing device.

14 Claims, 10 Drawing Sheets

|  |  |  |  |
|---|---|---|---|
| $350_0$ | $350_1$ | $350_2$ | $350_3$ |
| Block$_0$ $250_0$ | Block$_0$ $250_0$ | Block$_0$ $250_0$ | Block$_0$ $250_0$ |
| Block$_1$ $250_1$ | Block$_1$ $250_1$ | Block$_1$ $250_1$ | Block$_1$ $250_1$ |
| Block$_2$ $250_2$ | Block$_2$ $250_2$ | Block$_2$ $250_2$ | Block$_2$ $250_2$ |
| Block$_3$ $250_3$ | Block$_3$ $250_3$ | Block$_3$ $250_3$ | Block$_3$ $250_3$ |
| Block$_4$ $250_4$ | Block$_4$ $250_4$ | Block$_4$ $250_4$ | Block$_4$ $250_4$ |
| ⋮ | ⋮ | ⋮ | ⋮ |
| Block$_{L-4}$ $250_{L-4}$ | Block$_{L-4}$ $250_{L-4}$ | Block$_{L-4}$ $250_{L-4}$ | Block$_{L-4}$ $250_{L-4}$ |
| Block$_{L-3}$ $250_{L-3}$ | Block$_{L-3}$ $250_{L-3}$ | Block$_{L-3}$ $250_{L-3}$ | Block$_{L-3}$ $250_{L-3}$ |
| Block$_{L-2}$ $250_{L-2}$ | Block$_{L-2}$ $250_{L-2}$ | Block$_{L-2}$ $250_{L-2}$ | Block$_{L-2}$ $250_{L-2}$ |
| Block$_{L-1}$ $250_{L-1}$ | Block$_{L-1}$ $250_{L-1}$ | Block$_{L-1}$ $250_{L-1}$ | Block$_{L-1}$ $250_{L-1}$ |
| Block$_L$ $250_L$ | Block$_L$ $250_L$ | Block$_L$ $250_L$ | Block$_L$ $250_L$ |
| $240_0$ | $240_1$ | $240_2$ | $240_3$ |

Detect demand for a cache within a memory sub-system during a memory operation requiring access to at least a portion of an array of memory cells configured as single-level cell memory.
510

↓

Cause metadata associated with the memory operation to be stored in one or more page buffers of the at least a portion of the array, the one or more page buffers operating as an extension of the cache available to the memory sub-system.
520

FIG. 5

MEMORY SUB-SYSTEM CACHE EXTENSION TO PAGE BUFFERS OF A MEMORY ARRAY

TECHNICAL FIELD

Embodiments of the disclosure are generally related to memory sub-systems, and more specifically, relate to memory sub-system cache extension to page buffers.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of some embodiments of the disclosure.

FIG. 3 is a block schematic of a portion of an array of memory cells as could be used in a memory of the type described with reference to FIG. 1B according to an embodiment.

FIG. 5 is a flow diagram of a method for extending memory sub-system cache to page buffers of a memory array according to at least one embodiment.

DETAILED DESCRIPTION

Figure 1A:
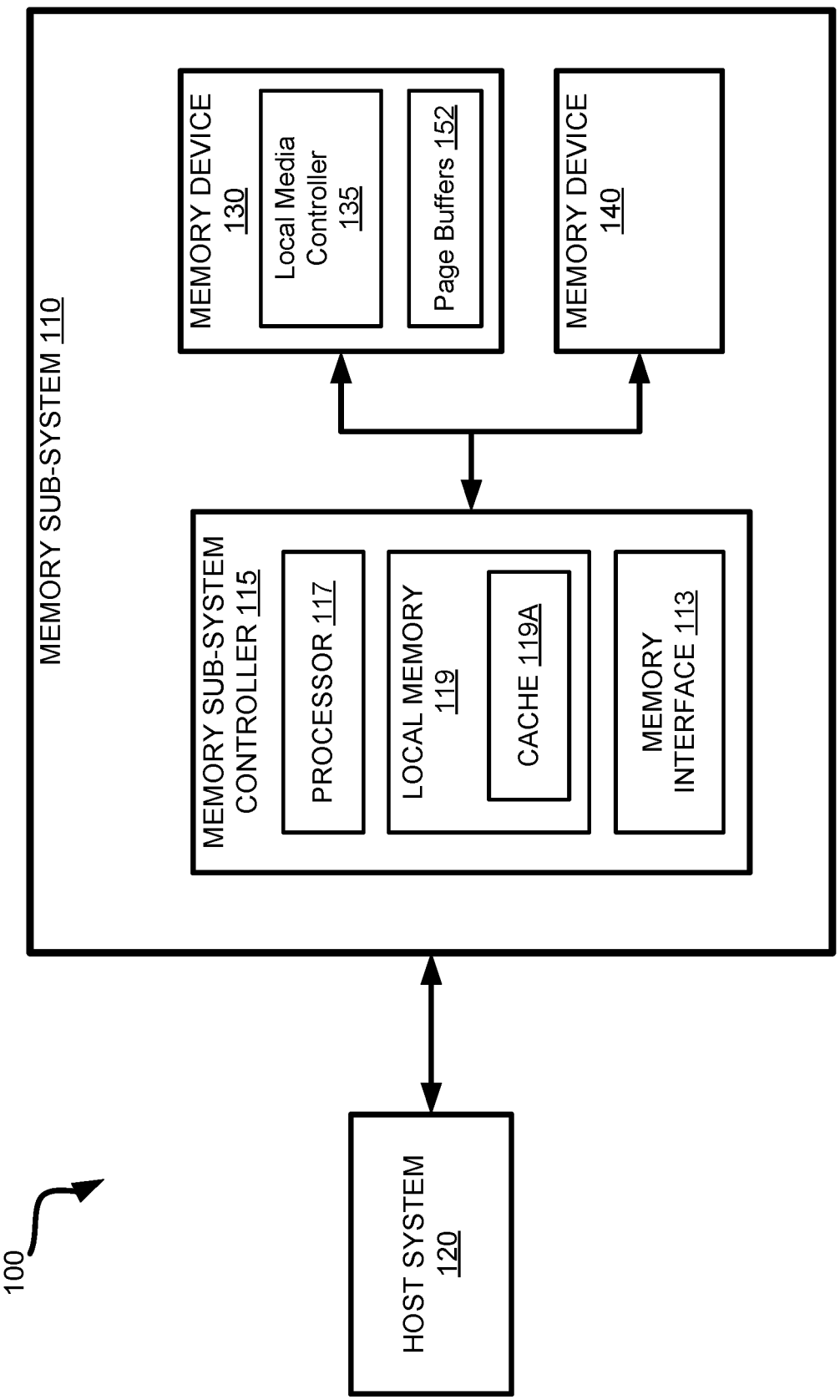
FIG. 1A illustrates an example computing system that includes a memory sub-system according to some embodiments.

Embodiments of the present disclosure are directed to extending memory sub-system cache to include page buffers of a memory array. Certain memory devices, such as negative-and (NAND) memory devices, can be made up of bits arranged in a two-dimensional or three-dimensional grid, also referred to as a memory array. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell.

Depending on the memory cell type, each memory cell can store one or more bits of binary information, and has various logic states that correlate to the number of bits being stored. The logic states can be represented by binary values, such as "0" and "1" or combinations of such values. A memory cell can be programmed (written to) by applying a certain voltage to the memory cell, which results in an electric charge being held by the memory cell, thus allowing modulation of the voltage distributions produced by the memory cell. A set of memory cells referred to as a memory page can be programmed together in a single operation, e.g., by selecting consecutive bitlines.

Precisely controlling the amount of the electric charge stored by the memory cell allows establishing multiple logical levels, thus effectively allowing a single memory cell to store multiple bits of information. A read operation can be performed by comparing the measured threshold voltages ($V_t$) exhibited by the memory cell to one or more reference voltage levels in order to distinguish between two logical levels for single-level cell (SLCs) and between multiple logical levels for multi-level cells. In various embodiments, a memory device can include multiple portions, including, e.g., one or more portions where the sub-blocks are configured as SLC memory and one or more portions where the sub-blocks are configured as multi-level cell (MLC) memory that can store three bits of information per cell and/or (triple-level cell) TLC memory that can store three bits of information per cell. The voltage levels of the memory cells in TLC memory form a set of 8 programming distributions representing the 8 different combinations of the three bits stored in each memory cell. Depending on how the memory cells are configured, each physical memory page in one of the sub-blocks can include multiple page types. For example, a physical memory page formed from single level cells (SLCs) has a single page type referred to as a lower logical page (LP). Multi-level cell (MLC) physical page types can include LPs and upper logical pages (UPs), TLC physical page types are LPs, UPs, and extra logical pages (XPs), and QLC physical page types are LPs, UPs, XPs and top logical pages (TPs). For example, a physical memory page formed from memory cells of the QLC memory type can have a total of four logical pages, where each logical page can store data distinct from the data stored in the other logical pages associated with that physical memory page, which is herein referred to as a "page."

In certain memory devices, such as within Universal Flash Storage (UFS) systems, the memory sub-system controller (e.g., processing device) does not have access to less expensive dynamic random access memory (DRAM). Instead, in such memory systems, the sub-system controller has access to cache such as static random access memory (SRAM) and/or tightly-coupled memory (TCM) that is more expensive than DRAM. Due to the higher per-megabyte expense of SRAM and TCM, less cache is available to the sub-system controller, which therefore is required to evict and read back a significant amount of data in and out of the cache from the NAND array, otherwise known as thrashing. This behavior of the memory sub-system controller in relation to cache impacts quality-of-service (QoS) for users of such memory devices.

Aspects of the present disclosure address the above and other deficiencies by having the memory sub-system controller (e.g., processing device) treat page buffers, which are coupled to memory cells configured at SLC memory, as an extension to cache of the sub-system controller. Page buffers are coupled to different blocks (or super blocks) of the memory array, as will be described in more detail, e.g., to buffer user data that is being written to or read from the memory array. Page buffers that are coupled to at least a portion of the memory array that is configured as SLC memory are used only to a fraction of available capacity due to SLC data being less dense than other multi-level cell data. In some embodiments, between two-thirds to three-fourths of such page buffers remain unused during a memory operation that is storing to or reading from the portion of the memory array that is configured as SLC memory. In this way, by storing cached metadata to page buffers that are not being used, the sub-system controller effectively expands its cache (e.g., at least a fourth more cache capacity available to the sub-system controller or processing device) during an SLC-based memory operation.

For example, in some embodiments, the memory sub-system controller (or processing device) is coupled to the memory device and includes a cache. In these embodiments, the processing device can detect demand for the cache during a memory operation requiring access to the single-level cell memory, where the demand might be beyond a capacity of the cache. Detecting the demand for cache can be performed by knowing the type of operation, an amount of metadata required to be accessed and/or updated for that type of operation, through counters that track cache accesses, and/or detecting a certain percentage of evictions compared to the capacity of the cache, by way of example. The processing device may further cause metadata associated with the memory operation to be stored in one or more page buffers, of the memory device, that operate as an extension of the cache available to the processing device. In at least some embodiments, the processing device further moves at least some of the metadata from one of the cache or the array of memory cells to the one or more page buffers to be cached.

Thus, in some cases, to cache the metadata may not require reading the metadata across a data interface bus (e.g., open NAND flash interface (ONFI) bus) of the memory sub-system, but simply causing the metadata to be read out of the array of memory cells into the page buffer and updating the metadata in place based on the memory operation. In some embodiments, the memory operation is an unmap operation and the metadata includes multiple logical-to-physical address translation (L2P) tables that will be updated based on an erase operation or a discard operation, for example. Other memory operations that heavily write to or read from SLC memory are envisioned.

Therefore, advantages of the systems and methods implemented in accordance with some embodiments of the present disclosure include, but are not limited to expanding cache that is available to a memory sub-system controller in a memory device such as within a UFS system where the cache is expensive. Further, treating the page buffers as an extension to the memory sub-system cache lessens the data traffic back and forth across the ONFI bus that couples the sub-system controller with the NAND dice, e.g., due to less thrashing and the possibility of directly caching metadata read out of the memory array. Other advantages will be apparent to those skilled in the art of memory sub-system cache architecture, which will be discussed hereinafter.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such media or memory devices. The memory sub-system 110 can be a storage device, a memory module, or a hybrid of a storage device and memory module.

The memory device 130 can be a non-volatile memory device. One example of non-volatile memory devices is a negative-and (NAND) memory device. A non-volatile memory device is a package of one or more dice. Each die can include one or more planes. Planes can be groups into logic units (LUN). For some types of non-volatile memory devices (e.g., NAND devices), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1," or combinations of such values.

The memory device 130 can be made up of bits arranged in a two-dimensional or three-dimensional grid, also referred to as a memory array. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. The host system 120 can provide data to be stored at the memory sub-system 110 and can request data to be retrieved from the memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple-level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage a memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In some embodiments, the memory sub-system controller 115 (e.g., processing device) further includes a memory interface component 113. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command or a confirmation that a program command was successfully performed. For example, the memory sub-system controller 115 can include a processor 117 (processing device) configured to execute instructions stored in local memory 119 for performing the operations described herein. The local memory 119 can be or include cache 119A, which may be, for example, SRAM or TCM in various embodiments. In some embodiments, there is no DRAM available to the processor 117.

In some embodiments, the memory sub-system controller 115 is integrated in whole or in part within the host system 120. Further, according to various embodiments, the memory device 130 includes a page buffer 152 for each array plane in the memory device 130, which can provide the circuitry used to program data to the memory cells of the memory device 130 and to read the data out of the memory cells. In some embodiments, control logic of the local media controller 135 acts on memory operations received from the memory interface 113, including to facilitate storing metadata to the page buffers 152. In some embodiments, this control logic is integrated in whole or in part within the memory sub-system controller 115 and/or the host system 120.

Figure 1B:
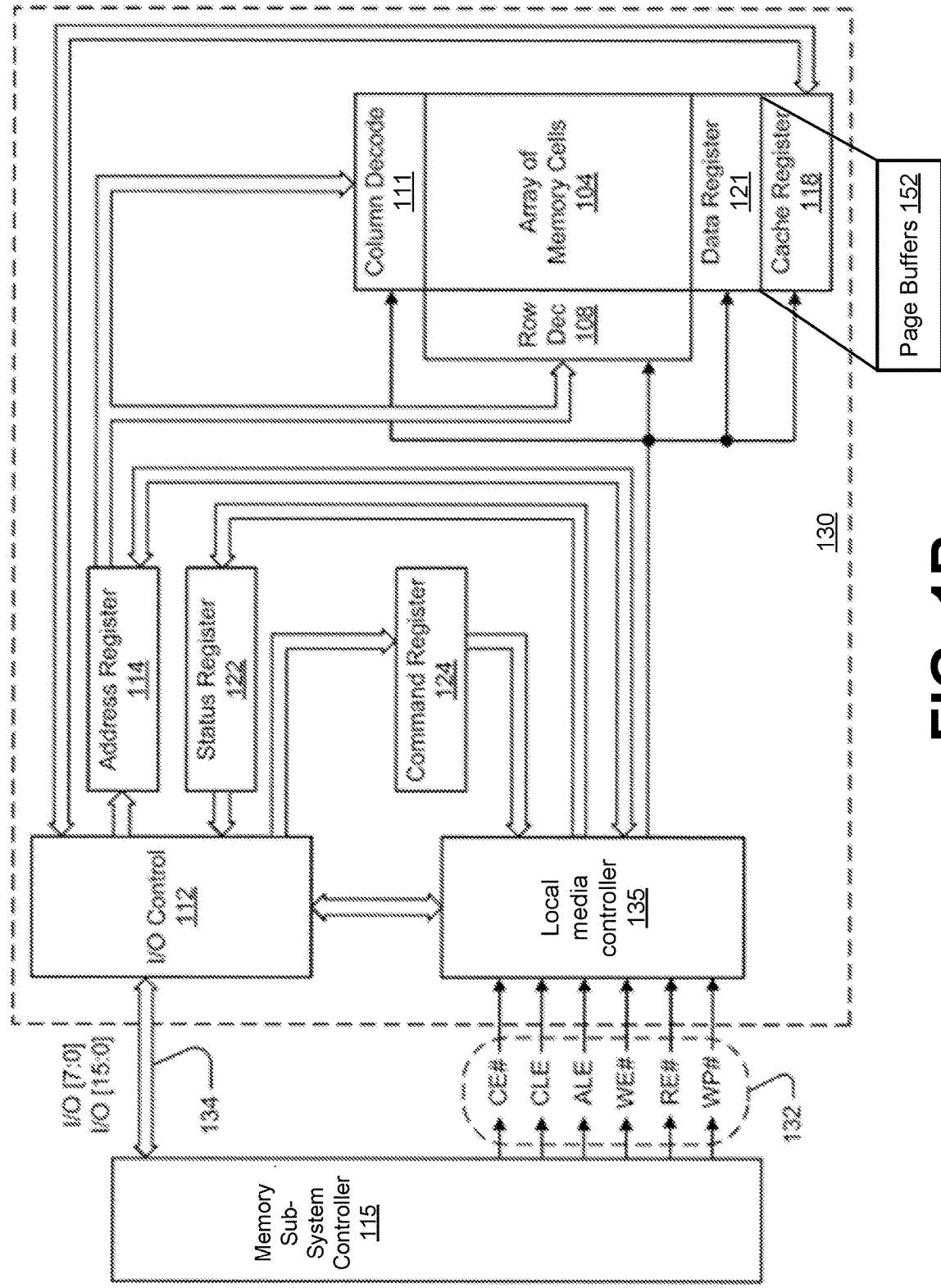
FIG. 1B is a block diagram of a memory device in communication with a memory sub-system controller of a memory sub-system according to an embodiment.

FIG. 1B is a simplified block diagram of a first apparatus, in the form of a memory device 130, in communication with a second apparatus, in the form of a memory sub-system controller 115 of a memory sub-system (e.g., the memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), can be a memory controller or other external host device.

The memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bitline). A single access line can be associated with more than one logical row of memory cells and a single data line can be associated with more than one logical column. Memory cells (not shown in FIG. 1B) of at least a portion of the array of memory cells 104 are capable of being programmed to one of at least two target data states.

Row decode circuitry 108 and column decode circuitry 111 are provided to decode address signals. Address signals are received and decoded to access the array of memory cells 104. The memory device 130 also includes input/output (I/O) control circuitry 112 to manage input of commands, addresses, and data to the memory device 130 as well as output of data and status information from the memory device 130. An address register 114 is in communication with the I/O control circuitry 112 and row decode circuitry 108 and column decode circuitry 111 to latch the address signals prior to decoding. A command register 124 is in communication with the I/O control circuitry 112 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations, and/or erase operations) on the array of memory cells 104. The local media controller 135 is in communication with row decode circuitry 108 and column decode circuitry 111 to control the row decode circuitry 108 and column decode circuitry 111 in response to the addresses.

The local media controller 135 is also in communication with a cache register 118 and a data register 121. The cache register 118 latches data, either incoming or outgoing, as directed by the local media controller 135 to temporarily store data while the array of memory cells 104 is busy writing or reading, respectively, other data. During a program operation (e.g., write operation), data can be passed from the cache register 118 to the data register 121 for transfer to the array of memory cells 104; then new data can be latched in the cache register 118 from the I/O control circuitry 112. During a read operation, data can be passed from the cache register 118 to the I/O control circuitry 112 for output to the memory sub-system controller 115; then new data can be passed from the data register 121 to the cache register 118. The cache register 118 and/or the data register 121 can form (e.g., can form at least a portion of) the page buffers 152 of the memory device 130. Each page buffer 152 can further include sensing devices such as a sense amplifier, to sense a data state of a memory cell of the array of memory cells 104, e.g., by sensing a state of a data line connected to that memory cell. As discussed herein, the local media controller 135 can further store metadata associated with a memory operation into the page buffers 152, e.g., by treating at least a portion of the page buffers 152 as cache in lieu of as a buffer to the array of memory cells 104. A status register 122 can be in communication with I/O control circuitry 112 and the local memory controller 135 to latch the status information for output to the memory sub-system controller 115.

The memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) can be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands can be received over input/output (I/O) pins [7:0] of I/O bus 134 at I/O control circuitry 112 and can then be written into a command register 124. The addresses can be received over input/output (I/O) pins [7:0] of I/O bus 134 at I/O control circuitry 112 and can then be written into address register 114. The data can be received over input/output (I/O) pins [7:0] for an 8-bit device or input/output (I/O) pins [15:0] for a 16-bit device at I/O control circuitry 112 and then can be written into cache register 118. The data can be subsequently written into data register 121 for programming the array of memory cells 104. In at least some embodiments, the I/O bus 134 and the I/O control circuitry 112 are integrated within a data interface bus, such as the data interface bus 125 of FIG. 4.

In an embodiment, cache register 118 can be omitted, and the data can be written directly into data register 121. Data can also be output over input/output (I/O) pins [7:0] for an 8-bit device or input/output (I/O) pins [15:0] for a 16-bit device. Although reference can be made to I/O pins, they can include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) can be used in the various embodiments.

Figure 2A:
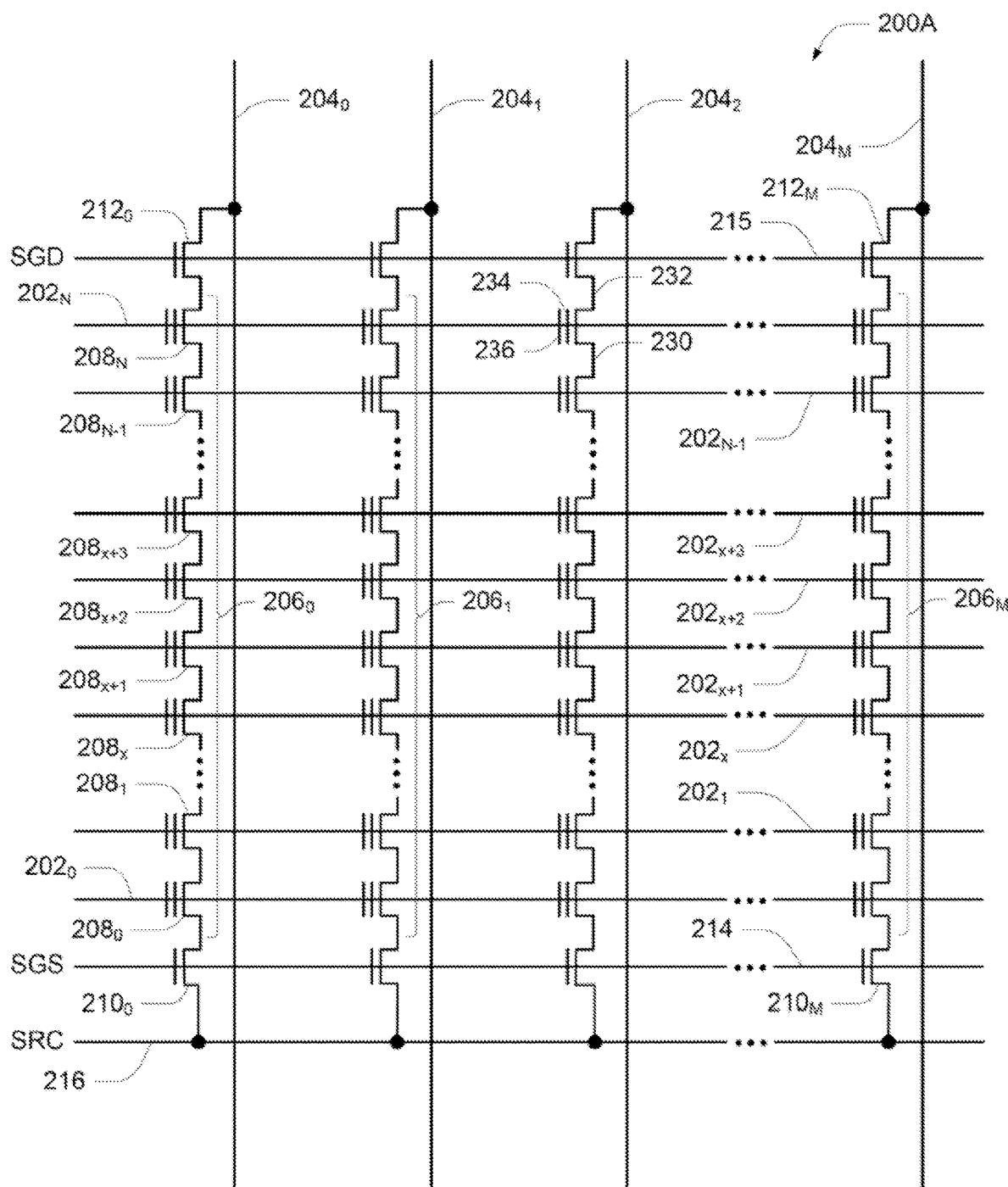
FIGS. 2A-2C are schematics of portions of an array of memory cells as could be used in a memory of the type described with reference to FIG. 1B according to an embodiment.
Figure 2B:
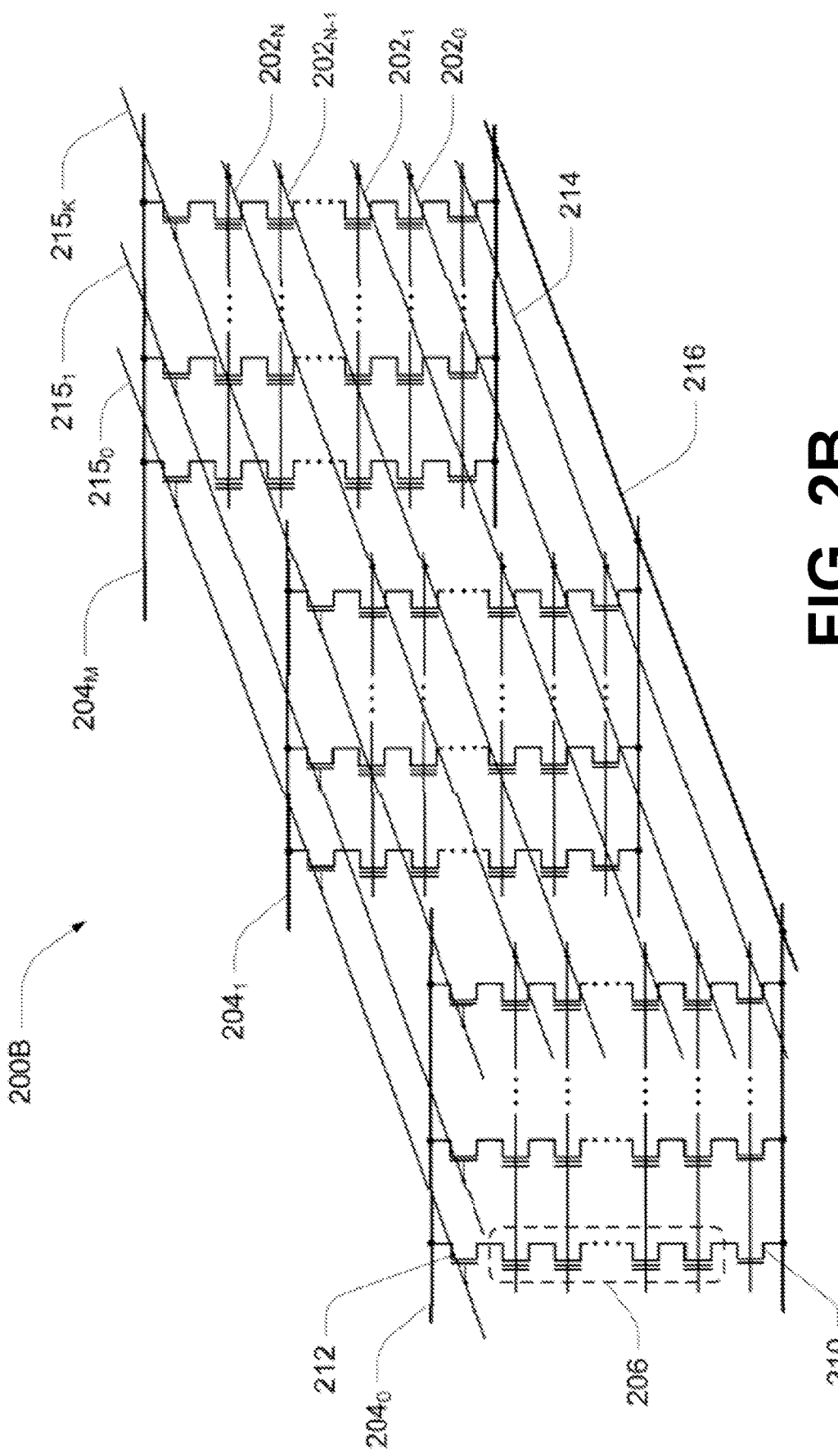
Figure 2C:
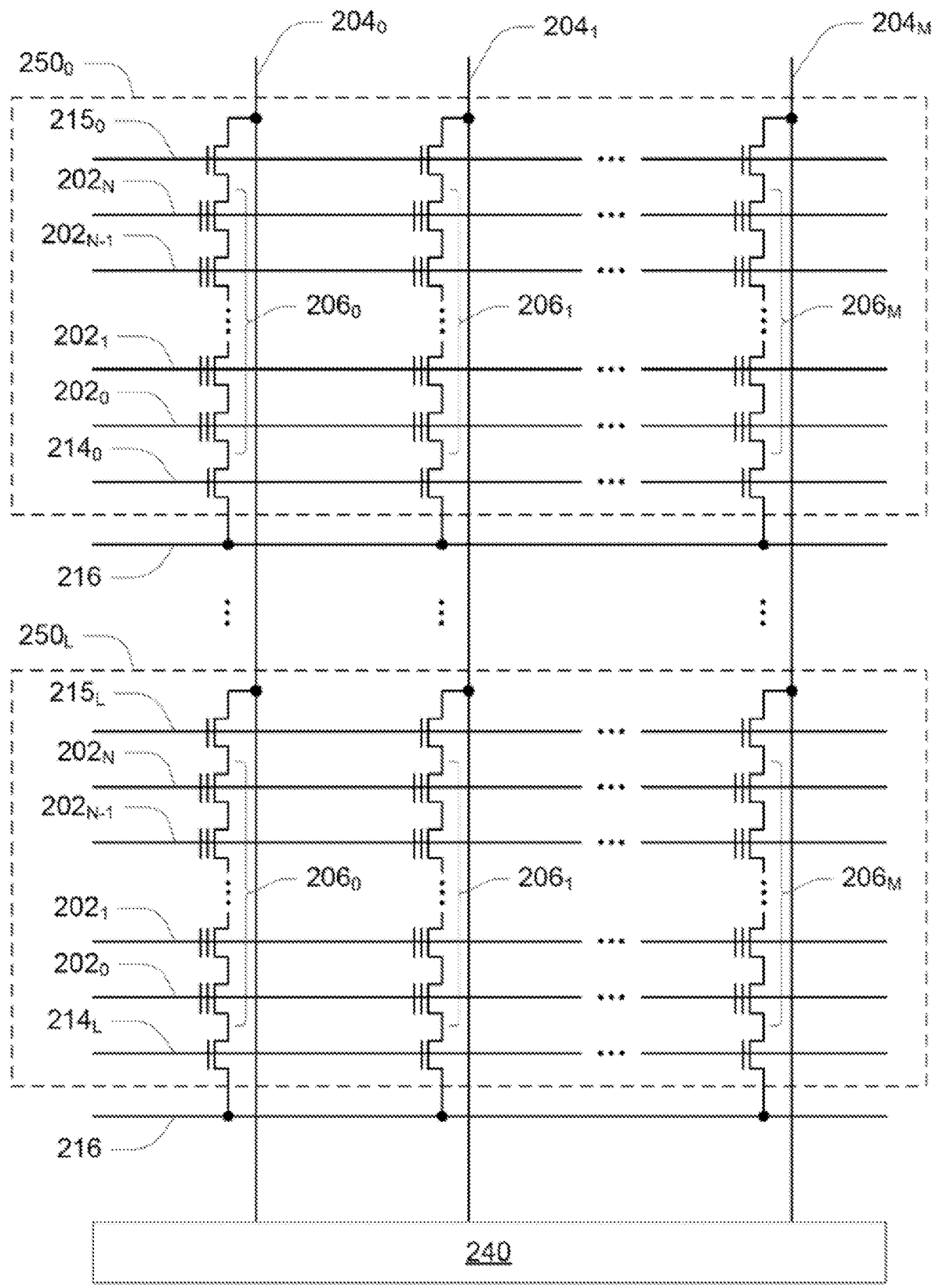

FIGS. 2A-2C are schematics of portions of an array of memory cells 200A, such as a NAND memory array, as could be used in a memory of the type described with reference to FIG. 1B according to an embodiment, e.g., as a portion of the array of memory cells 104. Memory array 200A includes access lines, such as wordlines $202_0$ to $202_N$, and data lines, such as bitlines $204_0$ to $204_M$. The wordlines 202 can be connected to global access lines (e.g., global wordlines), not shown in FIG. 2A, in a many-to-one relationship. For some embodiments, memory array 200A can be formed over a semiconductor that, for example, can be conductively doped to have a conductivity type, such as a p-type conductivity, e.g., to form a p-well, or an n-type conductivity, e.g., to form an n-well.

Memory array 200A can be arranged in rows (each corresponding to a wordline 202) and columns (each corresponding to a bitline 204). Each column can include a string of series-connected memory cells (e.g., non-volatile memory cells), such as one of NAND strings $206_0$ to $206_M$. Each NAND string 206 can be connected (e.g., selectively connected) to a common source (SRC) 216 and can include memory cells $208_0$ to $208_N$. Each bitline 204 and NAND string 206 can be associated with a sub-block of a set of sub-blocks of the memory array 200A. The memory cells 208 can represent non-volatile memory cells for storage of data. The memory cells 208 of each NAND string 206 can be connected in series between a select gate 210 (e.g., a field-effect transistor), such as one of the select gates $210_0$ to $210_M$ (e.g., that can be source select transistors, commonly referred to as select gate source), and a select gate 212 (e.g., a field-effect transistor), such as one of the select gates $212_0$ to $212_M$ (e.g., that can be drain select transistors, commonly referred to as select gate drain). Select gates $210_0$ to $210_M$ can be commonly connected to a select line 214, such as a source select line (SGS), and select gates $212_0$ to $212_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $208_0$ of the corresponding NAND string 206. For example, the drain of select gate $210_0$ can be connected to memory cell $208_0$ of the corresponding NAND string $206_0$. Therefore, each select gate 210 can be configured to selectively connect a corresponding NAND string 206 to the common source 216. A control gate of each select gate 210 can be connected to the select line 214.

The drain of each select gate 212 can be connected to the bitline 204 for the corresponding NAND string 206. For example, the drain of select gate $212_0$ can be connected to the bitline $204_0$ for the corresponding NAND string $206_0$. The source of each select gate 212 can be connected to a memory cell $208_N$ of the corresponding NAND string 206. For example, the source of select gate $212_0$ can be connected to memory cell $208_N$ of the corresponding NAND string $206_0$. Therefore, each select gate 212 can be configured to selectively connect a corresponding NAND string 206 to the corresponding bitline 204. A control gate of each select gate 212 can be connected to select line 215.

The memory array 200A in FIG. 2A can be a quasi-two-dimensional memory array and can have a generally planar structure, e.g., where the common source 216, NAND strings 206 and bitlines 204 extend in substantially parallel planes. Alternatively, the memory array 200A in FIG. 2A can be a three-dimensional memory array, e.g., where NAND strings 206 can extend substantially perpendicular to a plane containing the common source 216 and to a plane containing the bitlines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2A. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bitline 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $202_N$ and selectively connected to even bitlines 204 (e.g., bitlines $204_0$, $204_2$, $204_4$, etc.) can be one physical page of the memory cells 208 (e.g., even memory cells) while memory cells 208 commonly connected to wordline $202_N$ and selectively connected to odd bitlines 204 (e.g., bitlines $204_1$, $204_3$, $204_5$, etc.) can be another physical page of the memory cells 208 (e.g., odd memory cells).

Although bitlines $204_3$-$204_5$ are not explicitly depicted in FIG. 2A, it is apparent from the figure that the bitlines 204 of the array of memory cells 200A can be numbered consecutively from bitline $204_0$ to bitline $204_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $202_0$-$202_N$ (e.g., all NAND strings 206 sharing common wordlines 202). Unless expressly distinguished, a reference to a page of memory cells herein refers to the memory cells of a logical page of memory cells. Although the example of FIG. 2A is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

FIG. 2B is another schematic of a portion of an array of memory cells 200B as could be used in a memory of the type described with reference to FIG. 1B, e.g., as a portion of the array of memory cells 104. Like numbered elements in FIG. 2B correspond to the description as provided with respect to FIG. 2A. FIG. 2B provides additional detail of one example of a three-dimensional NAND memory array structure. The three-dimensional NAND memory array 200B can incorporate vertical structures which can include semiconductor pillars where a portion of a pillar can act as a channel region of the memory cells of NAND strings 206. The NAND strings 206 can be each selectively connected to a bitline $204_0$-$204_M$ by a select transistor 212 (e.g., that can be drain select transistors, commonly referred to as select gate drain) and to a common source 216 by a select transistor 210 (e.g., that can be source select transistors, commonly referred to as select gate source). Multiple NAND strings 206 can be selectively connected to the same bitline 204. Subsets of NAND strings 206 can be connected to their respective bitlines 204 by biasing the select lines $215_0$-$215_K$ to selectively activate particular select transistors 212 each between a NAND string 206 and a bitline 204. The select transistors 210 can be activated by biasing the select line 214. Each wordline 202 can be connected to multiple rows of memory cells of the memory array 200B. Rows of memory cells that are commonly connected to each other by a particular wordline 202 can collectively be referred to as tiers.

FIG. 2C is a further schematic of a portion of an array of memory cells 200C as could be used in a memory of the type described with reference to FIG. 1B, e.g., as a portion of the array of memory cells 104. Like numbered elements in FIG. 2C correspond to the description as provided with respect to FIG. 2A. The array of memory cells 200C can include strings of series-connected memory cells (e.g., NAND strings) 206, access (e.g., word) lines 202, data (e.g., bit) lines 204, select lines 214 (e.g., source select lines), select lines 215 (e.g., drain select lines) and a source 216 as depicted in FIG. 2A. A portion of the array of memory cells 200A can be a portion of the array of memory cells 200C, for example.

FIG. 2C depicts groupings of NAND strings 206 into blocks of memory cells 250, e.g., blocks of memory cells $250_0$-$250_L$. Blocks of memory cells 250 can be groupings of memory cells 208 ("erase blocks") that can be erased together in a single erase operation. Each block of memory cells 250 can represent those NAND strings 206 commonly associated with a single select line 215, e.g., select line $215_0$. The source 216 for the block of memory cells $250_0$ can be a same source as the source 216 for the block of memory cells $250_L$. For example, each block of memory cells $250_0$-$250_L$ can be commonly selectively connected to the source 216. Access lines 202 and select lines 214 and 215 of one block of memory cells 250 can have no direct connection to access lines 202 and select lines 214 and 215, respectively, of any other block of memory cells of the blocks of memory cells $250_0$-$250_L$.

The bitlines $204_0$-$204_M$ can be connected (e.g., selectively connected) to a buffer portion 240, which can be a portion of the page buffer of the memory device 130. The buffer portion 240 can correspond to a memory plane (e.g., the set of blocks of memory cells $250_0$-$250_L$). The buffer portion 240 can include sense circuits (which can include sense amplifiers) for sensing data values indicated on respective bitlines 204.

FIG. 3 is a block schematic of a portion of an array of memory cells 300 as could be used in a memory of the type described with reference to FIG. 1B. The array of memory cells 300 is depicted as having four memory planes 350 (e.g., memory planes $350_0$-$350_3$), each in communication with a respective buffer portion 240, which can collectively form a page buffer 352. While four memory planes 350 are depicted, other numbers of memory planes 350 can be commonly in communication with a page buffer 352. Each memory plane 350 is depicted to include L+1 blocks of memory cells 250 (e.g., blocks of memory cells $250_0$-$250_L$).

Figure 4:
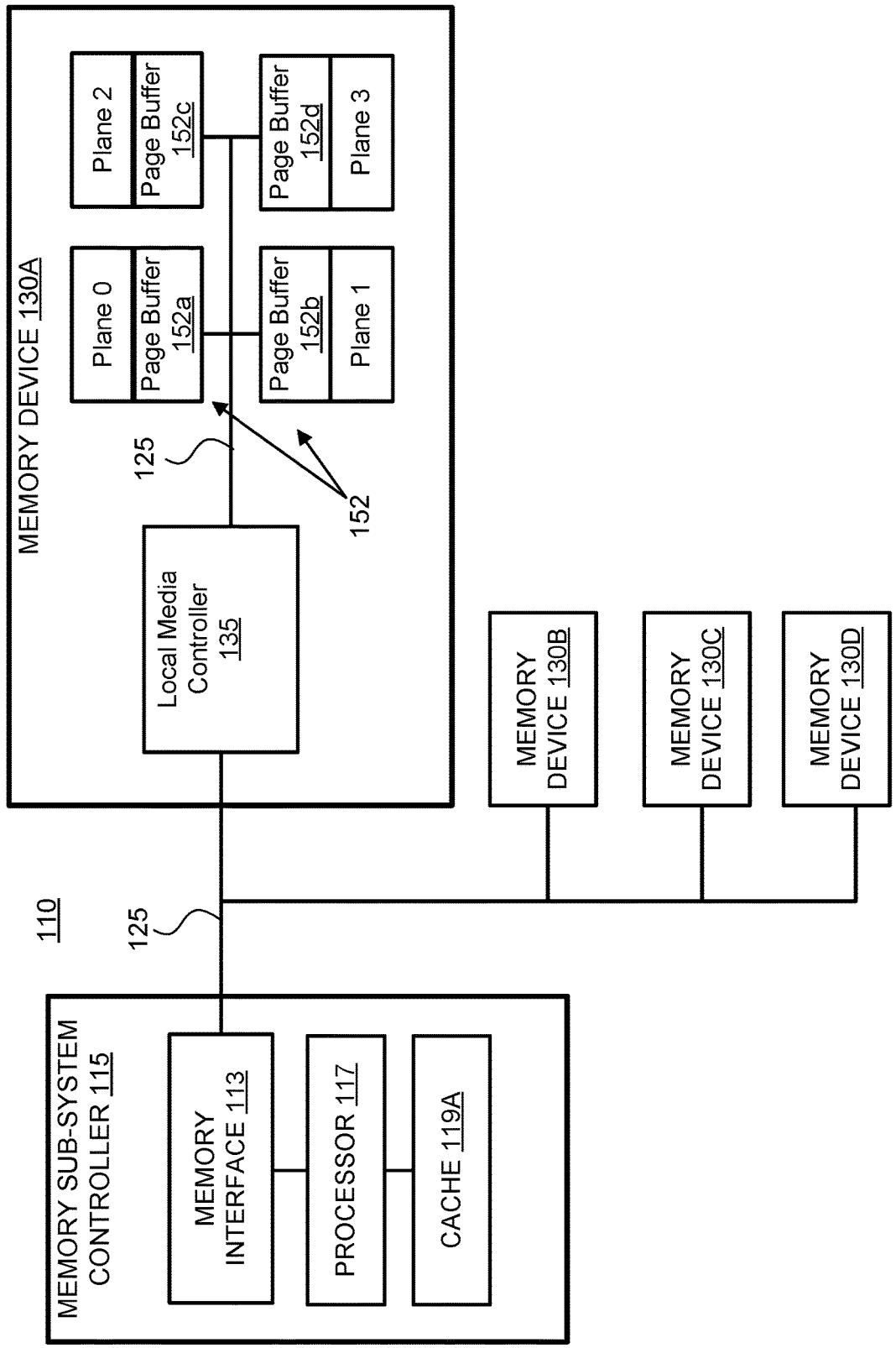
FIG. 4 is a block schematic of a portion of the memory sub-system of FIGS. 1A-1B according to at least some embodiments.

FIG. 4 is a block schematic of a portion of the memory sub-system 110 of FIGS. 1A-1B according to at least some embodiments. For example, in these embodiments, the memory sub-system 110 includes four memory devices, e.g., a first memory device 130A, a second memory device 130B, a third memory device 140C, and a fourth memory device 130D, each of which can be at least one die (or LUN), which share a data interface bus 125. Although four memory devices are illustrated, this is for purposes of explanation and more or fewer are also envisioned. In some embodiments, the data interface bus 125 is an Open NAND Flash Interface (ONFI) bus.

The first memory device 130A is representative of each die, which can include the local media controller 135 and one or more planes, e.g., Plane 0, Plane 1, Plane 2, and Plane 3 of memory cells. In some embodiments, each plane corresponds to a stripe that is programmable across the multiple dice of the four memory devices and there is at least one die per chip enable signal of the memory sub-system 110.

In at least some embodiments, a system such as the memory sub-system 110, includes a die (e.g., the first memory device 130A) having an array of memory cells organized into a set of sub-blocks and multiple wordlines (such as illustrated in FIGS. 2A-2C). The system can further include the data interface bus 125, which is coupled between the controller 115 and each of the dice (e.g., the memory devices 130A, 130B, 130C, and 130D). In these embodiments, the memory sub-system controller 115 is a processing device operatively coupled with the multiple dice via the data interface bus 125, where the local media controller 135 of each die is positioned along the data interface bus 125 between the controller 115 and the memory array of each respective die. The data interface bus 125 can thus be understood to be an ONFI channel (or other memory interface protocol channel) that is shared between the four planes of each dice coupled with the controller 115. Some systems include multiple multi-dice memory devices with an additional shared ONFI channel for each additional multi-dice memory device in the memory sub-system.

In these embodiments, there is at least one page buffer 152 for each plane of the memory array, e.g., a page buffer 152a for Plane 0, a page buffer 152b for Plane 1, a page buffer 152c for Plane 2, and a page buffer 152d for Plane 3. The controller 115 can direct metadata associated with memory operations that would normally be stored in the cache 119A to instead be stored in one or more pages buffers 152 of the memory device 130A. In some embodiments, caching metadata to the one or more page buffers is in response to detecting a deficiency in capacity of the cache 119A for the metadata to be accessed and/or updated for any given memory operation.

In various embodiments, the metadata can include redundant array of independent NAND (RAIN)-generated data, redundant array of independent disks (RAID)-generated data, cached logical-to-physical translation address (L2P) tables, cached flash translation layer (FTL) tables, or the write buffer metadata. The RAIN-generated or RAID-generated data may relate to a data protection scheme for solid state or flash storage devices, such as parity data, enabling the cache 119A to be more available for heavy-duty work of the controller 115 that is performed in between RAIN or RAID snapshot updates, for example. The L2P tables may need to be updated for an erase operation, a discard operation, or a write operation, among others. The FTL tables may be updated for any memory operations impacting an FTL table. The one or more memory buffers 152 may also be used as cache to store metadata for other media management operations, to include garbage collection. In at least some embodiments, the one or more page buffers 152 are treated as an SRAM (or SRAM-like) swapping from the cache 119A to reduce time to program (tREAD) and time to program (tPROG) to the SLC array.

In at least some embodiments, the memory operations are directed at the memory device 130A (by way of example) and specifically at a portion of the memory array that is configured as SLC memory. In some embodiments, the one or more page buffers 152 are logically partitioned and at least a reserved portion of the one or more page buffers are addressed identically as the cache 119A, e.g., and thus treated as an extension to the cache 119A. Although sending metadata from the controller 115 to the one or more page buffers 152 takes some bandwidth of the data interface bus 125, doing so may be performed to store metadata to the page buffers 152, operating as cache. Thus, by avoiding reading data in and evicting data out of the cache 119A at a high rate (e.g., thrashing), available bandwidth of the data interface bus 125 is actually increased and overall latency of the memory operations can be improved.

FIG. 5 is a flow diagram of a method 500 for extending memory sub-system cache to page buffers of a memory array according to at least one embodiment. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the sub-system memory controller 115 (e.g., control logic) of FIGS. 1A-1B, e.g., by the memory interface 113. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, demand for cache is detected. More specifically, the processing logic detects demand for a cache within a memory sub-system during a memory operation requiring access to at least a portion of an array of memory cells. In these embodiments, the at least a portion of the array is configured as single-level cell memory and the demand is beyond a capacity of the cache. Detecting the demand for cache can be performed by knowing the type of operation, an amount of metadata required to be accessed and/or updated for that type of operation, through counters that track cache accesses, and/or detecting a certain percentage of evictions compared to the capacity of the cache by way of example. In some embodiments, the demand is beyond a capacity of the cache and the page buffers are automatically employed as cache.

At operation 520, metadata is stored to page buffers. More specifically, the processing logic causes metadata associated with the memory operation to be stored in one or more page buffers of the multiple page buffers 152 of the at least a portion of the array, the one or more page buffers operating as an extension of the cache available to the memory sub-system. In at least some embodiments, operation 520 enables increasing capacity of the cache 119A by at least a fourth by employing the one or more page buffers as an extension to the cache 119A.

Figure 6:
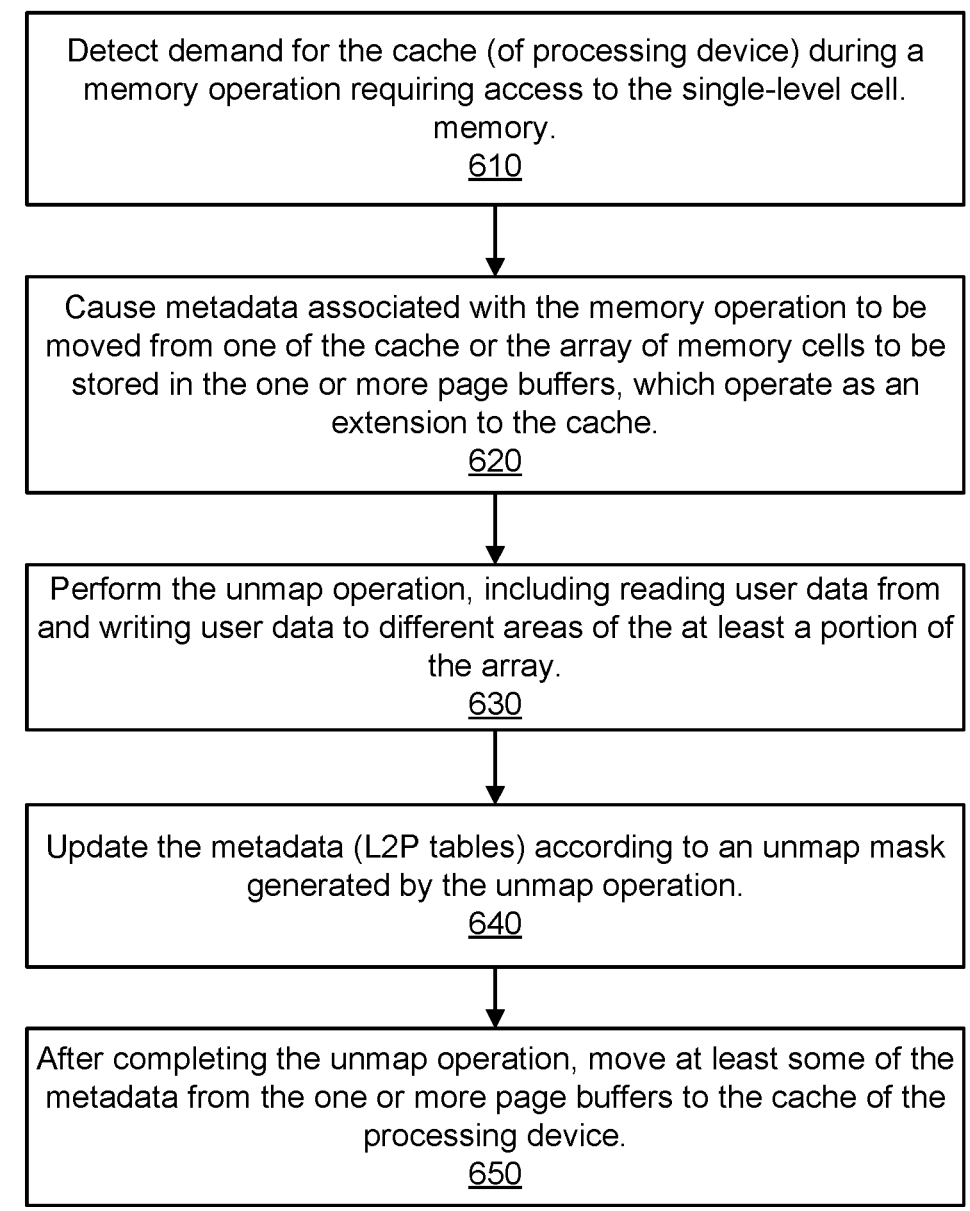
FIG. 6 is a flow diagram of a method for extending memory sub-system cache to page buffers of a memory array according to at least another embodiment.

FIG. 6 is a flow diagram of a method 600 for extending memory sub-system cache to page buffers of a memory array according to at least another embodiment. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the local media controller 135 of FIGS. 1A-1B, e.g., by control logic of the memory interface 113. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, demand for cache is detected. More specifically, the processing logic detects demand for the cache 119A during a memory operation requiring access to the single-level cell memory of the memory array. In some embodiments, the memory array is the array of memory cells 104, 200A, 200B, or 300 of a memory device. Detecting the demand for cache can be performed by knowing the type of operation, an amount of metadata required to be accessed and/or updated for that type of operation, through counters that track cache accesses, and/or detecting a certain percentage of evictions compared to the capacity of the cache by way of example. In some embodiments, the demand is beyond a capacity of the cache and the page buffers are automatically employed as cache.

At operation 620, metadata is stored to page buffers. More specifically, the processing logic causes metadata associated with the memory operation to be moved from one of the cache 119A or the array of memory cells to be stored in one or more page buffers of the multiple page buffers 152. In these embodiments, the one or more page buffers operate as an extension of the cache 119A available to the processing device (e.g., the controller 115), as was discussed with reference to FIG. 4.

In various embodiments, the processing device directs the memory device in performing a memory operation for which memory cells configured as SLC memory are primarily accessed. In some embodiments, the memory operation is an erase operation or a discard operation. Erase is an operation that moves data from a mapped address space to an unmapped address space. Logical blocks where erase is applied are set to an erased value of zero for example. An erase operation impacts what the memory device is required to do with the data in the unmapped address space. For example, after an erase is executed, software on the host system 120 should not be able to retrieve the erased logical block data.

A discard operation, however, is a non-secure variation of the erase functionality. A distinction between a discard and an erase is behavior of the memory device. Specifically, the memory device is not required to guarantee that the host system 120 would not be able to retrieve the original data from one or more logical block addresses (LBAs) that were marked for discard when a read operation is directed to those LBAs.

At operation 630, an unmap operation is performed. More specifically, the processing logic performs the unmap operation, including reading user data from and writing user data to different areas of the at least a portion of the array of memory cells. In at least some embodiments, the memory operation referenced in operations 610 and 620 may be an unmap operation, which the processing logic performs after a discard operation or an erase operation.

More specifically, the metadata associated with an unmap operation may include a number of logical-to-physical address translation (L2P) tables. In either a discard or an erase, mappings within L2P tables are deleted. In some embodiments, these mappings correspond to physical addresses for which data has been erased or discarded, e.g., so that these physical addresses can be relocated or remapped later to new LBAs of new user data from the host system.

At operation 640, the L2P tables are updated. More specifically, the processing logic updates multiple of the L2P tables according to an unmap mask generated by the unmap operation. In some embodiments, the mask maps to page locations within a physical block that stored data, but that now has been invalidated due to an erase or discard operation. In these embodiments, because an unmap operation may impact many L2P tables, a significant number of the L2P tables may need to be cached and updated during the unmap operation. In at least some embodiments, at least some of the L2P tables are stored in a reserved area of the memory array until needing to be read into the cache 119A. Thus, the processing logic may read these L2P tables directly from the memory array into the one or more page buffers 152, where the L2P tables may remain while being updated. This capability of avoiding reading L2P tables into the main cache 119A may help reduce congestion over the data interface bus 125 and provide extended capability of the cache 119A where the demand for the cache 119A exceeds its capability.

At operation 650, metadata is moved back to the memory device. More specifically, after completing the unmap operation, the processing logic moves at least some of the metadata from the one or more page buffers to the cache 119A of the processing device (e.g., the controller 115). The processing logic may then be able to update the metadata out of the cache 119A to complete any given memory operation.

Figure 7:
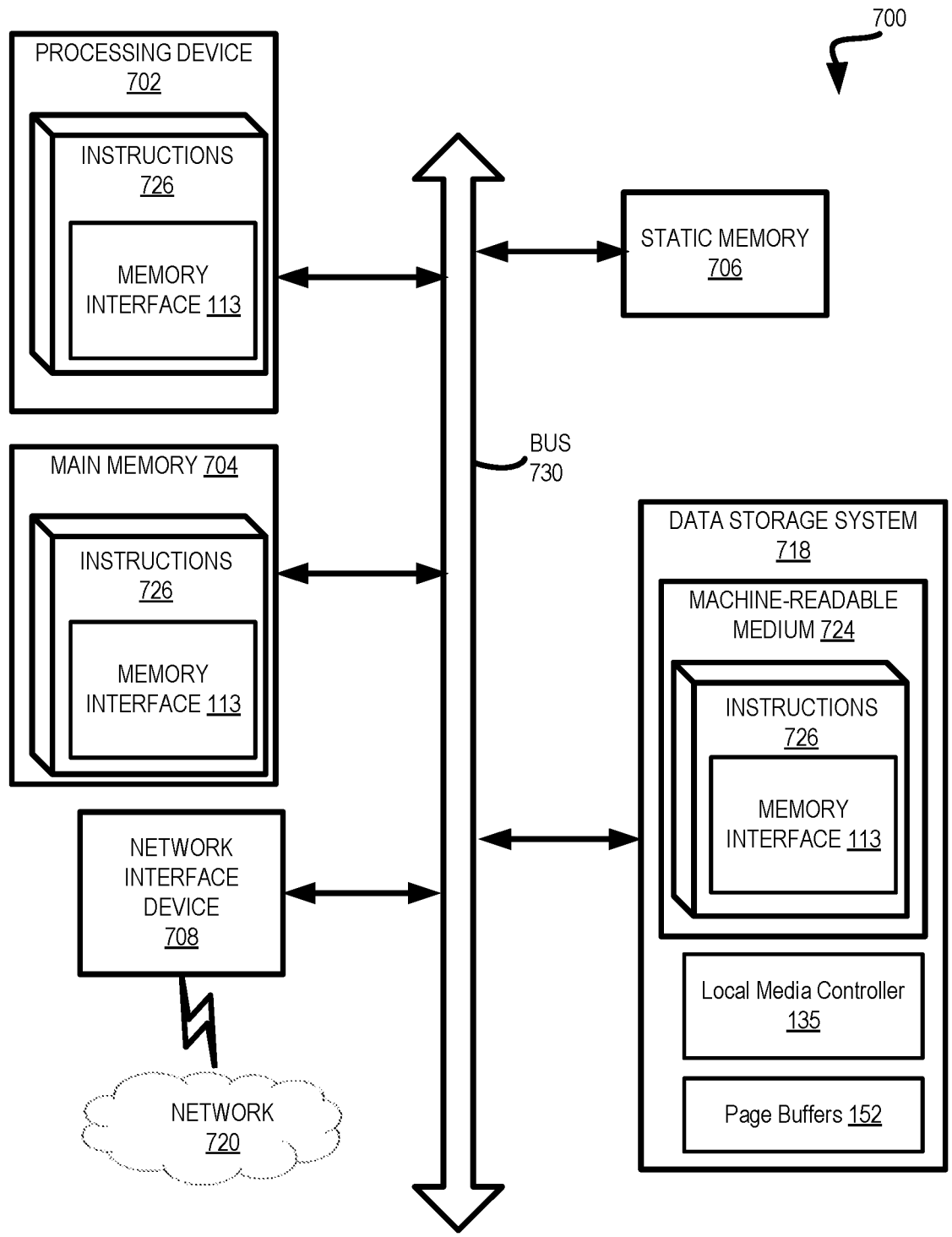
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the memory sub-system controller 115 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 710 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 728 for performing the operations and steps discussed herein. The computer system 700 can further include a network interface device 712 to communicate over the network 720.

The data storage system 718 can include a machine-readable storage medium 724 (also known as a computer-readable medium or a non-transitory computer-readable storage medium) on which is stored one or more sets of instructions 728 or software embodying any one or more of the methodologies or functions described herein. The data storage system 718 can further include the local media controller 135 and the page buffer 152 or 352 that were previously discussed. The instructions 728 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1A.

In one embodiment, the instructions 726 include instructions to implement functionality corresponding to a controller (e.g., the memory sub-system controller 115 of FIG. 1A-1B), e.g., which can include the memory interface 113 in various embodiments. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
 a memory device comprising an array of memory cells coupled with a plurality of page buffers, wherein at least a portion of the array is configured as single-level cell memory; and a processing device coupled to the memory device and comprising cache, the processing device to perform operations comprising:

detecting demand for the cache during an unmap operation requiring access to the single-level cell memory;

causing metadata associated with the unmap operation to be stored in one or more page buffers of the plurality of page buffers;

performing the unmap operation, including reading user data from and writing user data to different areas of the at least a portion of the array;

updating a plurality of logical-to-physical (L2P) translation tables of the metadata according to an unmap mask generated by the unmap operation; and after completing the unmap operation, moving at least some of the metadata from the one or more page buffers to the cache.

2. The system of claim 1, wherein the cache is at least one of static random access memory (SRAM) or tightly-coupled memory (TCM).

3. The system of claim 1, wherein the demand for the cache is beyond a capacity of the cache.

4. The system of claim 1, wherein the operations further comprise moving at least some of the metadata from one of the cache or the array of memory cells to the one or more page buffers.

5. The system of claim 1, wherein the metadata comprises at least one of redundant array of independent NAND (RAIN)-generated data, redundant array of independent disks (RAID)-generated data, cached L2P tables, or cached flash translation layer (FTL) tables.

6. A method comprising:

detecting demand for a cache within a memory sub-system during an unmap operation requiring access to at least a portion of an array of memory cells, wherein the at least a portion of the array is configured as single-level cell memory;

causing metadata associated with the unmap operation to be stored in one or more page buffers of a plurality of page buffers of the at least a portion of the array;

performing the unmap operation, including reading user data from and writing user data to different areas of the at least a portion of the array;

updating a plurality of logical-to-physical (L2P) translation tables of the metadata according to an unmap mask generated by the unmap operation; and after completing the unmap operation, moving at least some of the metadata from the one or more page buffers to the cache.

7. The method of claim 6, wherein the cache is at least one of static random access memory (SRAM) or tightly-coupled memory (TCM) and the memory sub-system is a Universal Flash Storage (UFS) system.

8. The method of claim 6, wherein the demand for the cache is beyond a capacity of the cache.

9. The method of claim 6, further comprising moving at least some of the metadata from one of the cache or the array of memory cells to the one or more page buffers.

10. The method of claim 6, wherein the metadata comprises at least one of redundant array of independent NAND (RAIN)-generated data, redundant array of independent disks (RAID)-generated data, cached L2P tables, or cached flash translation layer (FTL) tables.

11. A non-transitory computer-readable storage medium storing instructions, which when executed by a processing device of a memory sub-system, cause the processing device to perform operations comprising:

detecting demand for a cache within the processing device during an unmap operation requiring access to at least a portion of an array of memory cells, wherein the at least a portion of the array is configured as single-level cell memory; and causing metadata associated with the unmap operation to be stored in one or more page buffers of a plurality of page buffers of the at least a portion of the array;

performing the unmap operation, including reading user data from and writing user data to different areas of the at least a portion of the array;

updating a plurality of logical-to-physical (L2P) translation tables of the metadata according to an unmap mask generated by the unmap operation; and after completing the unmap operation, moving at least some of the metadata from the one or more page buffers to the cache.

12. The non-transitory computer-readable storage medium of claim 11, wherein the demand for the cache is beyond a capacity of the cache.

13. The non-transitory computer-readable storage medium of claim 11, wherein the operations further comprise moving at least some of the metadata from one of the cache or the array of memory cells to the one or more page buffers.

14. The non-transitory computer-readable storage medium of claim 11, wherein the metadata comprises at least one of redundant array of independent NAND (RAIN)-generated data, redundant array of independent disks (RAID)-generated data, cached L2P tables, or cached flash translation layer (FTL) tables.

* * * * *